United States Patent
Wang et al.

(10) Patent No.: US 6,930,156 B2
(45) Date of Patent: Aug. 16, 2005

(54) POLYMER BOUND SINGLE-SITE CATALYSTS

(75) Inventors: Shaotian Wang, Mason, OH (US); Shao-Hua Guo, Exton, PA (US)

(73) Assignee: Equistar Chemicals, LP, Houston, TX (US)

( * ) Notice: Subject to any disclaimer, the term of this patent is extended or adjusted under 35 U.S.C. 154(b) by 104 days.

(21) Appl. No.: 10/690,892

(22) Filed: Oct. 22, 2003

(65) Prior Publication Data

US 2005/0090384 A1 Apr. 28, 2005

(51) Int. Cl.⁷ .................................................. C08F 4/64
(52) U.S. Cl. ........................ 526/74; 526/160; 526/161; 526/165; 502/103; 502/125; 502/152; 502/162; 502/167
(58) Field of Search ................................. 502/103, 125, 502/152, 162, 167; 526/74, 160, 165, 161

(56) References Cited

U.S. PATENT DOCUMENTS

| | | | |
|---|---|---|---|
| 4,954,472 A | * 9/1990 | Scott et al. ................. | 502/152 |
| 5,444,141 A | 8/1995 | Guo ............................ | 526/347 |
| 5,451,652 A | 9/1995 | Guo et al. ................... | 526/333 |
| 5,475,073 A | 12/1995 | Guo ............................ | 526/333 |
| 5,480,954 A | 1/1996 | Guo ............................ | 526/330 |
| 5,492,985 A | 2/1996 | Peifer et al. ................ | 526/127 |
| 5,512,642 A | 4/1996 | Guo ............................ | 526/79 |
| 5,539,124 A | 7/1996 | Etherton et al. ............ | 548/402 |
| 5,637,660 A | 6/1997 | Nagy et al. ................. | 526/160 |
| 5,646,213 A | 7/1997 | Guo ............................ | 524/562 |
| 5,756,611 A | 5/1998 | Etherton et al. ............ | 526/127 |
| 6,034,027 A | 3/2000 | Krishnamurti et al. ...... | 502/200 |
| 6,153,713 A | 11/2000 | Guo ............................ | 526/329.7 |
| 6,340,771 B1 | 1/2002 | Hoang et al. ................ | 556/171 |
| 6,350,831 B1 | 2/2002 | Takemori et al. ........... | 526/160 |
| 6,455,657 B1 | 9/2002 | Guo et al. ................... | 526/347 |

* cited by examiner

*Primary Examiner*—Caixia Lu
(74) *Attorney, Agent, or Firm*—Shao-Hua Guo

(57) ABSTRACT

A single-site catalyst is disclosed. The catalyst comprises a transition metal complex, an activator, and an allylic alcohol-containing polymer. The catalyst has high activity and great capability to incorporate higher α-olefins into polyethylene. The polyethylene produced has high molecular weight and low density.

20 Claims, No Drawings

POLYMER BOUND SINGLE-SITE CATALYSTS

FIELD OF THE INVENTION

The invention relates to single-site catalysts. More particularly, the invention relates to polymer bound single-site catalysts.

BACKGROUND OF THE INVENTION

Single-site catalysts can be divided into metallocenes and non-metallocenes. Metallocene single-site catalysts are those which comprise transition metal complexes of cyclopentadienyl (Cp) or Cp derivative ligands. Non-metallocene single-site catalysts are often referred to those having one or more non-Cp, heteroatomic ligands, such as boraaryl, pyrrolyl, azaborolinyl, indenoindolyl, and quinolinyl ligands.

Single-site catalysts are generally homogeneous and soluble in olefins and most solvents. While these catalysts are most suitable for solution polymerizations, they need to be supported for use in the heterogeneous polymerization processes, including slurry and gas phase processes. Supporting single-site catalysts offer many challenges because of their high solubility. When a single-site catalyst is merely coated on or impregnated in an inorganic or polymer support, it tends to release from the support. This often causes many problems in slurry and gas phase polymerization, for example, reactor fouling, poor catalytic activity, low polymer bulk density, and poor polymer particle morphology.

To overcome the problems, many attempts have been made to chemically bond single-site catalysts to polymer supports. For instance, U.S. Pat. No. 5,492,985 teaches polystyrene bound single-site catalysts. Preparation of the polystyrene bound single-site catalysts involves a series of difficult reactions: forming chloromethylated polystyrene from polystyrene; forming methylpolystyrenecyclopentadiene by the reaction of chloromethylated polystyrene with cyclopentadienylsodium; forming lithiated methylpolystyrenecyclopentadiene by the reaction of n-butyllithium with methylpolystyrenecyclopentadiene; and then forming transition metal complex from the lithiated methylpolystyrenecyclopentadiene. This preparation is rather complex and costly.

It is apparent that new polymer bound single-site catalysts are needed. Ideally, the catalysts would be easy to prepare and remain high activity.

SUMMARY OF THE INVENTION

The invention is a single-site catalyst. The catalyst comprises a transition metal complex, an activator, and an allylic alcohol-containing polymer. The complex, activator, or both, is preferably supported onto the polymer. The catalyst has high catalytic activity for olefin polymerization and great capability to incorporate higher α-olefins into polyethylene.

DETAILED DESCRIPTION OF THE INVENTION

The catalyst composition of the invention comprises a transition metal complex, an activator and an allylic alcohol-containing polymer. Preferably, the transition metal complex has the general formula:

$$(L)_m\text{-M-}(X)_n$$

M is a transition metal; L and X are ligands. Preferably, M is Zr, Ti, or Hf. More preferably, M is Zr.

X is a labile ligand. "Labile ligand" means a ligand which is able to be activated by an activator to facilitate olefin polymerization. Preferably, X is independently selected from the group consisting of hydrogen, halides, $C_{1-10}$ hydrocarbyls, $C_{1-10}$ alkoxys, and $C_{6-10}$ aryloxys. The hydrocarbyl, alkoxy, and aryloxy ligands may also be substituted, for example, by halogen, alkyl, alkoxy, and aryloxy groups. More preferably, X is a halide. Most preferably, X is chloride.

Preferably, L is independently selected from the group consisting of substituted or unsubstituted cyclopentadienyls, boraaryls, pyrrolyls, azaborolinyls, quinolinyls, indenoindolyls, and phosphinimines, the like, and mixtures thereof. The L ligands provide the catalysts with "single-site" nature. That is, the catalyst has single active site for olefin polymerization and thus provides the polyolefin with relatively narrow molecular weight and composition distributions.

Two L ligands can be bridged. Groups that can be used to bridge L ligands include, for example, methylene, ethylene, 1,2-phenylene, and dialkyl silyls. Examples are —$CH_2$—, —$C(CH_3)_2$—, —$CH_2$—$CH_2$—, and —$Si(CH_3)_2$—. Bridging changes the geometry around the transition metal and can improve catalyst activity and other performance such as comonomer incorporation.

The complexes can be divided into two general categories: metallocene and non-metallocene. Metallocene complexes are transition metal complexes in which the L ligands are cyclopentadienyl (Cp) or substituted Cps such as methyl, isopropyl, and butyl Cps. Substituted Cps also include the multiple ring structures which have at least one Cp ring, such as indenyl, fluorenyl, and the like.

Non-metallocene complexes are those which contain at least one non-Cp L ligand. Preferred non-metallocene complexes include those which contain an L ligand selected from the group consisting of boraaryl, pyrrolyl, azaborolinyl, quinolinyl, indenoindolyl, and phosphinimine. These non-metallocene complexes are known. See, e.g. U.S. Pat. Nos. 6,034,027, 5,539,124, 5,756,611, 5,637,660, 6,340,771, and 6,350,831. The teachings of these patents are incorporated herein by reference.

Bridged indenoindolyl-containing transition metal complexes are particularly preferred. There are many ways to form a bridged indenoindolyl-containing transition metal complex. For example, a bridged complex can have the general structure I, II, III, or IV:

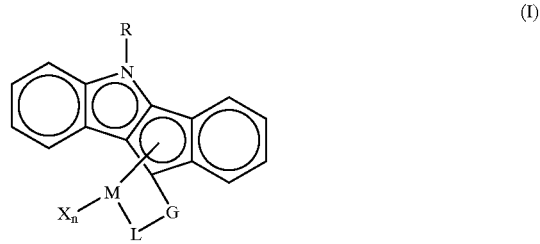

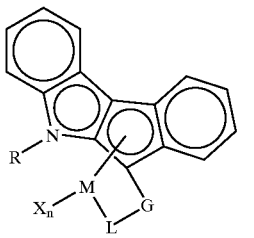

(II)

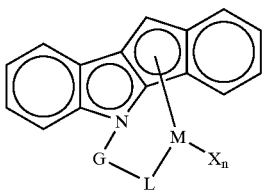

(III)

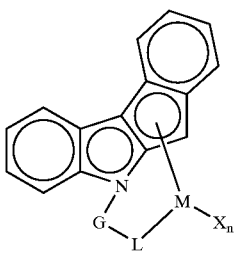

(IV)

G is a bridging group. Preferably, G is selected from the group consisting of dimethylsilyl, methylene, ethylene, and isopropylidene. R is an N-substituent, which can be selected from the group consisting of alkyl, aryl, aralkyl, boryl and silyl groups. Preferred R includes methyl, phenyl, benzyl, and trimetylsilyl. The L is preferably selected from the group consisting of Cps and alkylaminos. The ring hydrogen atoms can also be independently substituted with, e.g., alkyl, aryl, aralkyl, alkylaryl, silyl, halogen, alkoxy, aryloxy, siloxy, nitro, dialkyl amino, diaryl amino, and the like.

Suitable activators include alumoxanes, alkyl aluminums, alkyl aluminum halides, anionic compounds of boron or aluminum, trialkylboron compounds, triarylboron compounds, and mixtures thereof. Examples are methyl alumoxane (MAO) and polymeric MAO (PMAO), triethylaluminum, trimethylaluminum, diethylaluminum chloride, lithium tetrakis(pentafluorophenyl)borate, triphenylcarbenium tetrakis(pentafluorophenyl)borate, N,N-dimethyl anilinium tetrakis(pentafluorophenyl)borate, lithium tetrakis(pentafluorophenyl)aluminate, tris(pentafluorophenyl)boron, tris(pentabromophenyl)boron, and the like.

Suitable allylic alcohol-containing polymers include those which have recurring unit (also called monomeric unit) of an allylic alcohol. Allylic alcohols include those which has an allylic C=C and an OH group. Preferably, the allylic alcohol is selected from the group consisting of allyl alcohol, methallyl alcohol, and alkoxylates thereof. Allyl alcohol and allyl alcohol propoxylates are commercially available from Lyondell Chemical Company.

Suitable allylic alcohol-containing polymers include homopolymers of allylic alcohols. Examples are poly(allyl alcohol), poly(methallyl alcohol), and poly(allyl alcohol propoxylate). Methods for making these homopolymers are known. For example, U.S. Pat. No. 5,451,652, the teachings of which are incorporated herein by reference, teaches how to make homopolymers of allyl alcohol propoxylates.

Suitable allylic alcohol-containing polymers also include copolymers of allylic alcohol with a comonomer selected from the group consisting of alkyl acrylates, alkyl methacrylates, vinyl aromatics, vinyl halides, vinyl ethers, vinyl esters, unsaturated nitriles, allyl esters, allyl ethers, allyl carbonates, and conjugated dienes, the like, and mixtures thereof. Methods for making these copolymers are known. For instance, U.S. Pat. No. 5,480,954 teaches the copolymers of allylic alcohols and allyl esters; U.S. Pat. Nos. 5,512,642, 5,444,141 and 6,455,657 teach the copolymers of allylic alcohols and vinyl aromatics; and U.S. Pat. Nos. 5,475,073, 5,646,213 and 6,153,713 teach the copolymers of allylic alcohols and alkyl acrylates and methacrylates. The teachings of these patents are herein incorporated by reference.

Copolymers are preferred. More preferred are copolymers which comprise recurring units of allylic alcohol and vinyl aromatics. Examples are styrene-allyl alcohol copolymers, styrene-methallyl alcohol copolymers, styrene-allyl alcohol alkoxylate copolymers, styrene-methallyl alcohol alkoxylate copolymers, α-alkyl styrene-allyl alcohol copolymers, α-alkyl styrene-methallyl alcohol copolymers, α-alkyl styrene-allyl alcohol alkoxylate copolymers, α-alkyl styrene-methallyl alcohol alkoxylate copolymers, p-alkyl styrene-allyl alcohol copolymers, p-alkyl styrene-methallyl alcohol copolymers, p-alkyl styrene-allyl alcohol alkoxylate copolymers, p-alkyl styrene-methallyl alcohol alkoxylate copolymers, and copolymers of allyl alcohol, styrene and alkyl acrylates or methacrylates.

Suitable allylic alcohol-containing polymers preferably have a number average molecular weights (Mn) within the range of about 500 to about 10,000, more preferably about 1,000 to about 5,000, hydroxyl number about 20 mg KOH/g to about 500 mg KOH/g, more preferably about 50 mg KOH/g to about 250 mg KOH/g, hydroxyl functionality (i.e., the number of hydroxyl groups per polymer chain) about 2 to 5, and glass transition temperature ($T_g$) greater than about 25° C., more preferably greater than about 50° C. Commercially available copolymers of styrene and allyl alcohol, such as SAA-100, SAA-101, and SAA-103 (products of Lyondell Chemical Company) are particularly preferred. These SAA products have a hydroxyl number ranging from 125 to 255 mg KOH/g, Mw from 2,500 to 8,400, Mn from 1,200 to 3,200, and $T_g$ from 57 to 78° C.

Suitable allylic alcohol-containing polymers include those which are crosslinked. Crosslinking can be done by post-treatment of the polymer. For instance, a crosslinked polymer can be made by the reaction of the allylic alcohol-containing polymer with a crosslinking agent. Suitable crosslinking agents include multifunctional carboxylic acids or anhydrides, isocyanates, and melamine compounds. Alternatively, a crosslinked polymer can be made by using a multifunctional monomer such as divinyl benzene or diallyl phthalate in the polymerization in which the allylic alcohol-containing polymers are made. For instance, polymerizing allyl alcohol, styrene and divinyl benzene results in a crosslinked SAA copolymer.

One way to make the single-site catalyst of the invention is mixing an activator with an allylic alcohol-containing polymer, and then mixing the mixture to a transition metal complex. Alternatively, the transition metal complex is mixed with the activator, and the mixture is then mixed with the polymer. Further, the complex is first mixed with the polymer, and the mixture is mixed with the activator. The mixing can be performed at an ambient or elevated temperature. It can be performed in a dry form or in a solution. It can be performed inside or outside of the polymerization reactor.

Preferably, the transition metal complex, the activator, or both are supported onto the polymer. By "supporting," we mean that the complex, the activator, or both, is immobilized onto the polymer either by physical or chemical bonding. The hydroxyl group of the allylic alcohol-containing polymer provides an active site to react with the transition metal complex, and thus it is possible for the complex to chemically attach to the polymer chains. Similarly, activators such as alumoxanes and alkyl aluminums can react with the hydroxyl group of the polymer to form polymeric adduct. We found that the reaction of SAA copolymer with methyl alumoxane is rapid at an ambient temperature.

Preferably, the amount of activator is 1 to 5,000 times by weight of the amount of the transition metal complex. More preferably, the amount of the activator is 1 to 1,000 times of the amount of the complex. The amount of the allylic alcohol-containing polymer is not critical and depends on many factors including, e.g., the complex, the activator, and the hydroxyl number of the allylic alcohol-containing polymer used. Preferably, the amount of polymer used is about 5 wt % to about 95 wt % of the catalyst composition. More preferably, the amount of polymer is about 25 wt % to about 75 wt % of the catalyst composition.

Optionally, an inorganic oxide such as silica or polymeric support such as polyolefin or polystyrene can add to the catalyst. This is particularly desirable when the allylic alcohol-containing polymer of the catalyst is a liquid or has a low $T_g$. The added supports keep the catalyst as a solid at the polymerization temperature.

The invention includes an olefin polymerization in the presence of the single-site catalyst. The polymerization is preferably conducted in gas phase or slurry phase. Slurry phase polymerization is performed in an organic solvent that can disperse the catalyst and polyolefin. Preferred solvents include $C_4$ to $C_{10}$ linear, branched, and cyclic aliphatic hydrocarbons. Examples of suitable solvents are butane, hexane, cyclohexane, octane, heptane, isobutane, toluene, and mixtures thereof.

One advantage of the invention is that the complex, the activator, or both, is bound to the allylic alcohol-containing polymer, and thus the catalyst is not easily dissolved in the polymerization medium of slurry processes. We found that the catalysts of the invention remain high activity and great capacity to incorporate higher α-olefins into polyethylene. Particularly, when the transition metal complex contains an indenoindolyl ligand, the catalyst shows an extremely high activity and the polyethylene thus made has ultra-high molecular weight and very low density.

The polymerization is preferably conducted under pressure. The pressure is preferably in the range of about 50 to about 15,000 psi, more preferably from about 100 to about 5,000 psi, and most preferably from about 200 to about 2,000 psi. Generally, high pressure leads to high productivity. Laboratory operations are conducted under relatively low pressure for safety reasons. Polymerization is preferably conducted at a temperature below 100° C. More preferably, the temperature is within the range of about 50° C. to about 90° C.

A scavenger is preferably used in the polymerization. Scavengers reduce the effect of a trace amount of moisture and oxygen existing in the reactor on the polymerization and increase the activity and lifetime of the catalysts. Suitable scavengers include alkyl aluminum compounds. Scavengers are added into the reactor prior to the addition of catalyst. The amount of scavengers is about 1 to 2000 times in mole of the catalyst.

Suitable olefins for the polymerization include $C_{2-10}$ α-olefins, cyclic olefins, dienes, and mixtures thereof. Examples are ethylene, propylene, 1-butene, 1-hexene, cyclopetene, and isoprene. Preferably, the olefin is a mixture of ethylene and a $C_{3-10}$ α-olefin. More preferably, the olefin is mixture of from about 85 to about 99 wt % of ethylene and from about 1 to about 15 wt % of $C_{3-10}$ α-olefin. We found that the catalyst of the invention has great capacity to incorporate $C_{3-10}$ α-olefins into polyethylene and produce polyethylene having low or very low density.

The following examples merely illustrate the invention. Those skilled in the art will recognize many variations that are within the spirit of the invention and scope of the claims.

EXAMPLE 1

Catalyst Comprising Dimethylsilyl-Bridged 2-Methyl Indeno[2,1-b]Indolyl Cyclopentadienyl Zirconium Dichloride, MAO and SAA-103

Catalyst Preparation

In an inert atmosphere glove box, 1.57 g of SAA-103 (product of Lyondell Chemical Company, OH#: 125 mg KOH/g, Mw: 8,400, Mn: 3,200, $T_g$: 78° C.) is dissolved in 8 mL of toluene. MAO (product of Albemarle Corporation, 1.26 mL, 30 wt % in toluene) is slowly added into the SAA solution at 25° C. with agitation. The solution viscosity increases as MAO is added. The reaction continues at 25° C. for an hour after MAO addition.

Dimethylsilyl-bridged 2-methylindeno[2,1-b]indolyl cyclopentadienyl zirconium dichloride (26.8 mg) is mixed with 1.4 mL MAO (30 wt % toluene solution) to form a red solution. The resulting solution is then added to the above SAA-MAO mixture at 25° C. with agitation. The mixture is stirred for an additional 30 minutes and then dried by vacuum (about 28.5 inches mercury) at 25° C. for about 2 hours. About 2.7 g of supported catalyst is obtained.

Polymerization

A one-liter, stainless-steel reactor is charged with 75 mL of 1-hexene. 1.0 mL of triisobutylaluminum (TIBAL) (1.0 M solution in heptane) and 4 mg of Stadis 425 (fatty amine, product of Akzo Chemical) in heptane solution are flushed into the reactor with 470 mL of isobutene by nitrogen pressure. The reactor is then pressurized with ethylene to 320 psig at 80° C. The supported catalyst (28 mg) is then flashed into the reactor with about 75 mL of isobutane. The polymerization proceeds for 0.5 hour at 80° C. The reactor is vented and the polymer is collected and dried by vacuum oven at 60° C., yielding 90.2 g of polymer. The polymer has a weight average molecular weight (Mw): 177,250, molecular weight distribution (Mw/Mn): 3.2, and density: 0.907 g/cc. The catalyst activity is 3,590 kg of polymer per g of metal per hour.

EXAMPLE 2

Catalyst Comprising Dimethylsilyl-Bridged 2-Methylindeno[2,1-b]Indolyl Cyclopentadienyl Zirconium Dichloride, MAO and SAA-100

The general procedure of Example 1 is repeated, but SAA-100 (product of Lyondell Chemical, OH#: 210 mg KOH/g, Mw: 3,000, Mn: 1,500, $T_g$: 62° C.) is used. The resulting polymer (94.8 g) has Mw: 107,820, Mw/Mn: 2.7, and density: 0.908 g/cc. The catalyst activity is 3,450 kg of polymer per g of metal per hour.

EXAMPLE 3

Catalyst Comprising Dimethylsilyl-Bridged 2-Methylindeno[2,1-b]Indolyl Cyclopentadienyl Zirconium Dichloride, MAO and SAA-105

The general procedure of Example 1 is repeated, but SAA-105 (an experimental product of Lyondell Chemical, OH#: 64 mg KOH/g, Mw: 4,400, Mn: 1,800, $T_g$: 66° C.) is used. The resulting polymer (67.9 g) has Mw: 112,280, Mw/Mn: 2.7, and density: 0.910 g/cc. The catalyst activity is 2,600 kg of polymer per g of metal per hour.

EXAMPLE 4

Catalyst Comprising Bis(Cyclopentadienyl) Zirconium Dichloride, MAO, and SAA-103

The general procedure of Example 1 is followed, but in the catalyst preparation, 15.2 mg of bis(cyclopentadienyl) zirconium dichloride, rather than 26.8 mg of dimethylsilyl-bridged indeno[2,1-b]indolyl cyclopentadienyl zirconium dichloride, is used; in the polymerization, 120 mg of supported catalyst is used. The polymer (20.7 g) has Mw: 111,180, Mw/Mn: 6.0 and density: 0.927 g/cc. The catalyst activity is 188 kg of polymer per g of metal per hour.

EXAMPLE 5

Catalyst Comprising Bis(n-Butyl Cyclopentadienyl) Zirconium Dichloride, TIBAL, MAO, and SAA-103

In an inert atmosphere glove box, 6.0 mg of SAA-103 is dissolved in 24 mL of toluene. To the solution is added 8 mL of TIBAL (1.2 M solution in heptane). The solution viscosity increases as TIBAL is added. The reaction continues at 25° C. for an hour after TIBAL addition. The solvent is removed by vacuum, yielding 6.6 g of solid SAA-TIBAL mixture.

Bis(n-butyl cyclopentadienyl) zirconium dichloride (26.8 mg) is mixed with 1.45 mL MAO (30 wt % toluene solution) to form a red solution. The resulting solution is then added to 1.10 g of the above SAA-TIBAL mixture at 25° C. The mixture is stirred for an additional 30 minutes and then dried by vacuum (about 28.5 inches mercury) at 25° C. for about an hour. About 1.6 g of supported catalyst is obtained.

The polymerization procedure is followed, except 64 mg of the above supported catalyst is used. The polymer (31.9 g) has Mw: 119,500, Mw/Mn: 3.2, and density: 0.921 g/cc. The catalyst activity is 545 kg of polymer per g of metal per hour.

EXAMPLE 6

Catalyst Comprising 1-Methyl-Borabenzen Cyclopentadienyl Zirconium Dichloride, TIBAL, F20 and SAA-103

In an inert atmosphere glove box, 7.6 mg of 1-methyl-borabenzen cyclopentadienyl zirconium dichloride and 26.6 mg of trityltetrakis(pentafluorophenyl)borate ("F20," product of Asahi) are dissolved in 5 mL of toluene. The solution is added to 1.1 g of SAA-TIBAL mixture prepared according to the method of Example 5. The mixture is stirred for 30 minutes and then dried by vacuum (about 28.5 inches mercury) at 25° C. for about an hour. About 1.2 g of supported catalyst is obtained.

The polymerization procedure of Example 1 is followed, but 120 mg of supported catalyst is used. The polymer (6.9 g) has Mw: 84,150, and Mw/Mn: 7.7. The catalyst activity is 63 kg of polymer per g of metal per hour.

EXAMPLE 7

Catalyst Comprising 1-Methyl-Borabenzen Cyclopentadienyl Zirconium Dichloride, MAO, and SAA-103

In an inert atmosphere glove box, 4 g of SAA-103 is dissolved in 20 mL of toluene. MAO (2.4 mL, 30 weight percent MAO in toluene solution) is slowly added into the SAA solution at 25° C. with agitation. The solution viscosity increases as MAO is added. The reaction continues at 25° C. for an hour after MAO addition. The solvent is removed by vacuum, yielding 5.04 g of SAA-MAO mixture.

1-Methyl-borabenzen cyclopentadienyl zirconium dichloride (7.0 mg) and 0.9 mL of MAO (30 wt % toluene solution) are mixed to form a red solution. The solution is added to 0.78 g of the above SAA-MAO mixture. The mixture is stirred for 30 minutes at 25° C. and dried by vacuum, yielding about 1.1 g of supported catalyst.

The polymerization procedure of Example 1 is followed, but 61 mg of the above supported catalyst is used. The polymer (10.7 g) has Mw: 128,570 and Mw/Mn: 16.9. The catalyst activity is 192 kg of polymer per g of metal per hour.

EXAMPLE 8

Catalyst Comprising Bis(Cyclopentadienyl) Titanium Dichloride, MAO, and SAA-103

In an inert atmosphere glove box, 6.4 mg of bis (cyclopentadienyl) titanium dichloride is mixed with 0.90 mL of MAO (30 wt % toluene solution). The resulting mixture is added to 0.78 g of SAA-MAO mixture prepared according to Example 7. The mixture is stirred for 30 minutes at 25° C. and dried by vacuum, yielding about 1.1 g of supported catalyst.

The polymerization procedure of Example 1 is followed, but 122 mg of the above supported catalyst is used. The polymer (6.4 g) has Mw: 79,780 and Mw/Mn: 3.2. The catalyst activity is 105 kg of polymer per g of metal per hour.

EXAMPLE 9

Catalyst Comprising 8-Methyl[1,2-b]Indenoindolyl Dimethylsilyl t-Buylamino Titanium Dimethyl, MAO, and SAA-103

In an inert atmosphere glove box, 10.9 mg of [1,2-b] indenoindolyl dimethylsilyl t-buylamino titanium dimethyl complex is mixed with 0.90 mL of MAO (30 wt % toluene solution). The resulting mixture is added to 0.78 g of SAA-MAO mixture prepared according to Example 7. The mixture is stirred for 30 minutes at 25° C. and dried by vacuum, yielding about 1.1 g of supported catalyst.

The polymerization procedure of Example 1 is followed, but 58 mg of the above supported catalyst is used. The polymer (65.3 g) has an ultra-high molecular weight which is not measurable by GPC and density: 0.883 g/cc. The catalyst activity is 2,130 kg of polymer per g of metal per hour.

TABLE 1

Catalyst Activity

| Example No. | Complex | Activator | Allylic Alcohol-Containing Polymer | Catalyst Activity Kg polymer per g metal per hour |
|---|---|---|---|---|
| 1 | Dimethylsilyl-bridged 2-methylindeno[2,1-b]indolyl cyclopentadienyl zirconium dichloride | MAO | SAA-103 | 3,590 |
| 2 | Dimethylsilyl-bridged 2-methylindeno[2,1-b]indolyl cyclopentadienyl zirconium dichloride | MAO | SAA-100 | 3,450 |
| 3 | Dimethylsilyl-bridged 2-methylindeno[2,1-b]indolyl cyclopentadienyl zirconium dichloride | MAO | SAA-105 | 2,600 |
| 4 | Bis(cyclopentadienyl) zirconium dichloride | MAO | SAA-103 | 188 |
| 5 | Bis(n-butyl cyclopentadienyl) zirconium dichloride | TIBAL plus MAO | SAA-103 | 545 |
| 6 | 1-methyl-borabenzen cyclopentadienyl zirconium dichloride | TIBAL plus F20 | SAA-103 | 63 |
| 7 | 1-Methyl-borabenzen cyclopentadienyl zirconium dichloride | MAO | SAA-103 | 192 |
| 8 | Bis(cyclopentadienyl) titanium dichloride | MAO | SAA-103 | 105 |
| 9 | 8-Methyl[1,2-b]indenoindolyl dimethylsilyl t-buylamino titanium dimethyl | MAO | SAA-103 | 2,130 |

We claim:

1. A catalyst composition which comprises a transition metal complex, an activator, and a polymer comprising recurring unit of an allylic alcohol.

2. The composition of claim 1 wherein the complex, the activator, or both, is supported onto the polymer.

3. The composition of claim 1 wherein the allylic alcohol is selected from the group consisting of allyl alcohol, methallyl alcohol, and alkoxlates thereof.

4. The composition of claim 1 wherein the polymer further comprises recurring units selected from the group consisting of alkyl acrylates and methacrylates, vinyl aromatics, vinyl halides, vinyl ethers, vinyl esters, unsaturated nitriles, allyl esters, allyl ethers, allyl carbonates, conjugated dienes, and mixtures thereof.

5. The composition of claim 1 wherein the polymer is selected from the group consisting of styrene-allyl alcohol copolymers, styrene-methallyl alcohol copolymers, styrene-allyl alcohol alkoxylate copolymers, styrene-methallyl alcohol alkoxylate copolymers, α-alkyl styrene-allyl alcohol copolymers, α-alkyl styrene-methallyl alcohol copolymers, α-alkyl styrene-allyl alcohol alkoxylate copolymers, α-alkyl styrene-methallyl alcohol alkoxylate copolymers, p-alkyl styrene-allyl alcohol copolymers, p-alkyl styrene-methallyl alcohol copolymers, p-alkyl styrene-allyl alcohol alkoxylate copolymers, p-alkyl styrene-methallyl alcohol alkoxylate copolymers, and mixtures thereof.

6. The composition of claim 1 wherein the polymer is a styrene-allyl alcohol copolymer.

7. The composition of claim 1 wherein the transition metal complex has the general structure:

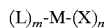

wherein M is a transition metal; X is independently selected from the group consisting of hydrogen, halides, $C_{1-10}$ hydrocarbyls, $C_{1-10}$ alkoxys, and $C_{6-10}$ aryloxys; L is independently selected from the group consisting of substituted or unsubstituted cyclopentadienyls, boraaryls, pyrrolyls, azaborolinyls, quinolinyls, indenoindolyls, and phosphinimines; the sum of m and n equals to the valence of M; and two L ligands are optionally bridged.

8. The composition of claim 1 wherein the activator is selected from the group consisting of alumoxanes, alkyl aluminums, alkyl aluminum halides, anionic compounds of boron or aluminum, trialkylboron compounds, triarylboron compounds, and mixtures thereof.

9. The composition of claim 1 wherein the activator is an alumoxane.

10. A process which comprises polymerizing an olefin in the presence of a catalyst composition comprising a transition metal complex, an activator, and a polymer comprising recurring unit of an allylic alcohol.

11. The process of claim 10 wherein the complex, the activator, or both, is supported onto the polymer.

12. The process of claim 10 wherein the allylic alcohol is selected from the group consisting of allyl alcohol, methallyl alcohol, and alkoxlates thereof.

13. The process of claim 10 wherein the polymer further comprises recurring units selected from the group consisting of alkyl acrylates and methacrylates, vinyl aromatics, vinyl halides, vinyl ethers, vinyl esters, unsaturated nitriles, allyl esters, allyl ethers, allyl carbonates, conjugated dienes, and mixtures thereof.

14. The process of claim 10 wherein the polymer is selected from the group consisting of styrene-allyl alcohol copolymers, styrene-methallyl alcohol copolymers, styrene-allyl alcohol alkoxylate copolymers, styrene-methallyl alcohol alkoxylate copolymers, α-alkyl styrene-allyl alcohol copolymers, α-alkyl styrene-methallyl alcohol copolymers, α-alkyl styrene-allyl alcohol alkoxylate copolymers, α-alkyl styrene-methallyl alcohol alkoxylate copolymers, p-alkyl styrene-allyl alcohol copolymers, p-alkyl styrene-methallyl alcohol copolymers, p-alkyl styrene-allyl alcohol alkoxylate copolymers, p-alkyl styrene-methallyl alcohol alkoxylate copolymers, and mixtures thereof.

15. The process of claim 10 wherein the polymer is a styrene-allyl alcohol copolymer.

16. The process of claim 10 wherein the transition metal complex has the general structure:

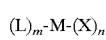

wherein M is a transition metal; X is independently selected from the group consisting of hydrogen, halides, $C_{1-10}$ hydrocarbyls, $C_{1-10}$ alkoxys, and $C_{6-10}$ aryloxys; L is independently selected from the group consisting of substituted or unsubstituted cyclopentadienyls, boraaryls, pyrrolyls, azaborolinyls, quinolinyls, indenoindolyls, and phosphinimines; the sum of m and n equals to the valence of M; and two L ligands are optionally bridged.

17. The process of claim 10 wherein the activator is selected from the group consisting of alumoxanes, alkyl aluminums, alkyl aluminum halides, anionic compounds of boron or aluminum, trialkylboron compounds, triarylboron compounds, and mixtures thereof.

18. The process of claim 10 wherein the transition metal complex has at least one indenoindolyl ligand.

19. The process of claim 10 wherein the activator is selected from the group consisting of alumoxanes, trialkyl aluminums, and mixtures thereof.

20. The process of claim 10 wherein the olefin is a $C_{2-10}$ α-olefin.

* * * * *